US012639697B2

(12) United States Patent
Bruley

(10) Patent No.: US 12,639,697 B2
(45) Date of Patent: May 26, 2026

(54) INTEGRATED DIGITAL AND PHYSICAL CARD ISSUANCE PROCESSES

(71) Applicant: Entrust Corporation, Shakopee, MN (US)

(72) Inventor: Nicolas Bruley, Paris (FR)

(73) Assignee: Entrust Corporation, Shakopee, MN (US)

( * ) Notice: Subject to any disclaimer, the term of this patent is extended or adjusted under 35 U.S.C. 154(b) by 27 days.

(21) Appl. No.: 18/343,395

(22) Filed: Jun. 28, 2023

(65) Prior Publication Data

US 2023/0419300 A1 Dec. 28, 2023

Related U.S. Application Data

(60) Provisional application No. 63/356,316, filed on Jun. 28, 2022.

(51) Int. Cl.
*G06Q 20/34* (2012.01)
*G06F 8/61* (2018.01)
*G06K 7/10* (2006.01)
*G06K 7/14* (2006.01)

(52) U.S. Cl.
CPC ............. *G06Q 20/351* (2013.01); *G06F 8/61* (2013.01); *G06K 7/10722* (2013.01); *G06K 7/1417* (2013.01)

(58) Field of Classification Search
None
See application file for complete search history.

(56) References Cited

U.S. PATENT DOCUMENTS

| | | | |
|---|---|---|---|
| 10,248,954 B2 | 4/2019 | Jin et al. | |
| 10,387,862 B2 * | 8/2019 | Laracey | G06Q 20/10 |
| 10,475,035 B2 | 11/2019 | Xu et al. | |
| 10,839,375 B2 | 11/2020 | Narasimhan et al. | |
| 11,036,873 B2 * | 6/2021 | Lopez | G06Q 20/3829 |
| 11,720,872 B2 * | 8/2023 | Laracey | G06Q 30/06 |
| | | | 705/17 |
| 2013/0317928 A1 * | 11/2013 | Laracey | G06Q 20/3552 |
| | | | 705/41 |

(Continued)

FOREIGN PATENT DOCUMENTS

| | | | | | |
|---|---|---|---|---|---|
| DE | 102016014651 A1 * | 6/2018 | | ......... | H04L 9/3228 |
| WO | WO-2013177548 A1 * | 11/2013 | | ........... | G06Q 20/10 |
| WO | WO-2022136236 A1 * | 6/2022 | | ........... | G06Q 20/405 |

OTHER PUBLICATIONS

Google Patents English Language Translation of DE-102016014651-A1. https://patents.google.com/patent/DE102016014651A1/en?oq=DE-102016014651-A1 (Year: 2018).*

(Continued)

*Primary Examiner* — Ayal I. Sharon
(74) *Attorney, Agent, or Firm* — Merchant & Gould P.C.

(57) ABSTRACT

A process for integrating physical payment card and digital payment card issuance is provided. In example aspects, data flows for physical payment card creation are enhanced by adding digital payment card enrollment procedures that may be performed in association with issuance of the physical payment card, thereby allowing a mobile application to utilize a digital version of the physical payment card via coordination with a digitization service provided by a card bureau and/or external service.

18 Claims, 13 Drawing Sheets

(56) References Cited

U.S. PATENT DOCUMENTS

| | | | |
|---|---|---|---|
| 2014/0180918 A1 | 6/2014 | Ekers et al. | |
| 2014/0344153 A1* | 11/2014 | Raj | G06Q 20/385 |
| | | | 705/44 |
| 2015/0019439 A1* | 1/2015 | Phillips | G06Q 20/326 |
| | | | 705/64 |
| 2015/0180836 A1* | 6/2015 | Wong | G06Q 20/3672 |
| | | | 713/172 |
| 2015/0339664 A1* | 11/2015 | Wong | H04L 63/0823 |
| | | | 705/71 |
| 2016/0057619 A1* | 2/2016 | Lopez | G06Q 20/3829 |
| | | | 380/247 |
| 2016/0140545 A1* | 5/2016 | Flurscheim | H04L 9/3234 |
| | | | 705/76 |
| 2016/0239818 A1* | 8/2016 | Laracey | G06Q 20/405 |
| 2017/0243224 A1* | 8/2017 | Kamal | G06Q 20/3224 |
| 2017/0366530 A1* | 12/2017 | Dominguez | H04L 63/083 |
| 2020/0082371 A1* | 3/2020 | Laracey | G06Q 20/10 |
| 2020/0151731 A1* | 5/2020 | Kohli | G06Q 40/00 |
| 2020/0175515 A1* | 6/2020 | Radu | G06Q 40/02 |
| 2021/0158343 A1 | 5/2021 | Varns | |
| 2022/0019995 A1* | 1/2022 | Ngo | G06Q 20/385 |
| 2022/0318394 A1* | 10/2022 | Broome | G06F 21/57 |
| 2024/0029042 A1* | 1/2024 | Laracey | G06Q 20/202 |
| 2024/0070655 A1* | 2/2024 | Puehse | G06Q 20/20 |

OTHER PUBLICATIONS

International Search Report and Written Opinion for PCT/US2023/069284, mailed Oct. 25, 2023.

* cited by examiner

Receive Cardholder Identifying Information 202

Prepare Batch Data Including Account Number and Cardholder Data 204

Register Data At Digital Card Enabling Entity 206

Enroll Mobile Device 208

Provision Card on Mobile Device 210

Finalize Physical and Digital Card Provisioning With Card Issuer / TSP 212

200

INTEGRATED DIGITAL AND PHYSICAL CARD ISSUANCE PROCESSES

CROSS-REFERENCE TO RELATED APPLICATIONS

The present application claims priority from U.S. Provisional Patent Application No. 63/356,316, filed on Jun. 28, 2022, the disclosure of which is hereby incorporated by reference in its entirety.

BACKGROUND

Individuals are commonly issued payment cards, such as credit cards, in physical form. That is, an issuing institution, such as a bank, will issue a card to an individual, with the card being registered with a particular payment network (e.g., Visa, MasterCard, etc.).

Increasingly, individuals wish to have greater flexibility with respect to use of payment cards, for example to use such payment cards in mobile application payment scenarios. In such cases, some third-party mobile payment solutions (e.g., ApplePay, Google Pay, and the like) can receive and store credit card account information for an individual, and create a tokenized representation of that card for use within a mobile application.

Although the above solutions result in a cardholder having access to both a physical credit card and a digital representation of the same credit card for mobile payment, this requires the cardholder to separately register his or her physical card within a particular mobile payment scheme. This has a number of disadvantages for both the cardholder, and the banking institution that issues the physical credit card. For the cardholder, this process requires the cardholder to first receive the physical card and then separately register that physical card to create the corresponding digital representation of that card. Not only does this reduce convenience, it prevents the cardholder from using the card until he or she receives the physical card. For the banking institution, this results in that institution potentially not being involved in the digital card enrollment process at all, since the digital card enrollment process would typically be performed outside of the banking institution's control.

SUMMARY

In accordance with aspects of the present disclosure, a process for integrating physical payment card and digital payment card issuance is provided. In example aspects, data flows for physical payment card creation are enhanced by adding digital payment card enrollment procedures that may be performed in conjunction with issuance of the physical payment card, thereby allowing a mobile application to utilize a digital version of the physical payment card via coordination with a digitization service provided by a card bureau and/or external service.

In a first aspect, a method of issuing a digital payment card in association with a physical payment card by a card issuer is provided. The method includes performing a card data preparation process and initiating a card digitization process. The card data preparation process includes, in association with issuance of a physical payment card, receiving digital issuance information from a card issuer at a digital card enrollment cloud service, the digital issuance information being based on cardholder data including cardholder identifier and contact information of the cardholder. The card data preparation process further includes transmitting an enrollment message to the cardholder, the enrollment message being unique to the cardholder and including a link to initiate a card digitization process. The card digitization process includes receiving a request from a mobile device of the cardholder to initiate creation of a digital payment card corresponding to the physical payment card at the digital card enrollment cloud service, the request being initiated in response to selection of the link at the mobile device. The card digitization process further includes validating a customer identifier received in the request, and in response to validating the customer identifier, digitizing the card at the digital card enrollment cloud service.

In a second aspect, a system for issuing a digital payment card in association with issuance of a physical payment card by a card issuer is provided. The system includes a computing device comprising a processor and a memory storing instructions which, when executed, implement a digital card enrollment service configured to perform a card data preparation process and to initiate a card digitization process. The card data preparation process includes, in association with issuance of a physical payment card, receiving digital issuance information from a card issuer at a digital card enrollment cloud service, the digital issuance information being based on cardholder data including cardholder identifier and contact information of the cardholder. The card data preparation process further includes transmitting an enrollment message to the cardholder, the enrollment message being unique to the cardholder and including a link to initiate a card digitization process. The card digitization process includes receiving a request from a mobile device of the cardholder to initiate creation of a digital payment card corresponding to the physical payment card at the digital card enrollment cloud service, the request being initiated in response to selection of the link at the mobile device. The card digitization process further includes validating a customer identifier received in the request, and in response to validating the customer identifier, digitizing the card at the digital card enrollment cloud service.

In a third aspect, a method of creating a digital payment card associated with a physical payment card of a cardholder is provided. The method includes receiving, at a mobile device of a cardholder, data including a link to initiate a card digitization process. The method further includes, in response to selection of the link: receiving a card payload of the digital payment card; determining whether a compatible mobile application is installed on the mobile device; and based on a determination that a compatible mobile application is installed on the mobile device, initiating a digitization process to associate a digital representation of the payment card with the mobile application, the digitization process including sending a digitization request to a digital card enrollment cloud service, the digitization request including a cardholder identifier and the card payload.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
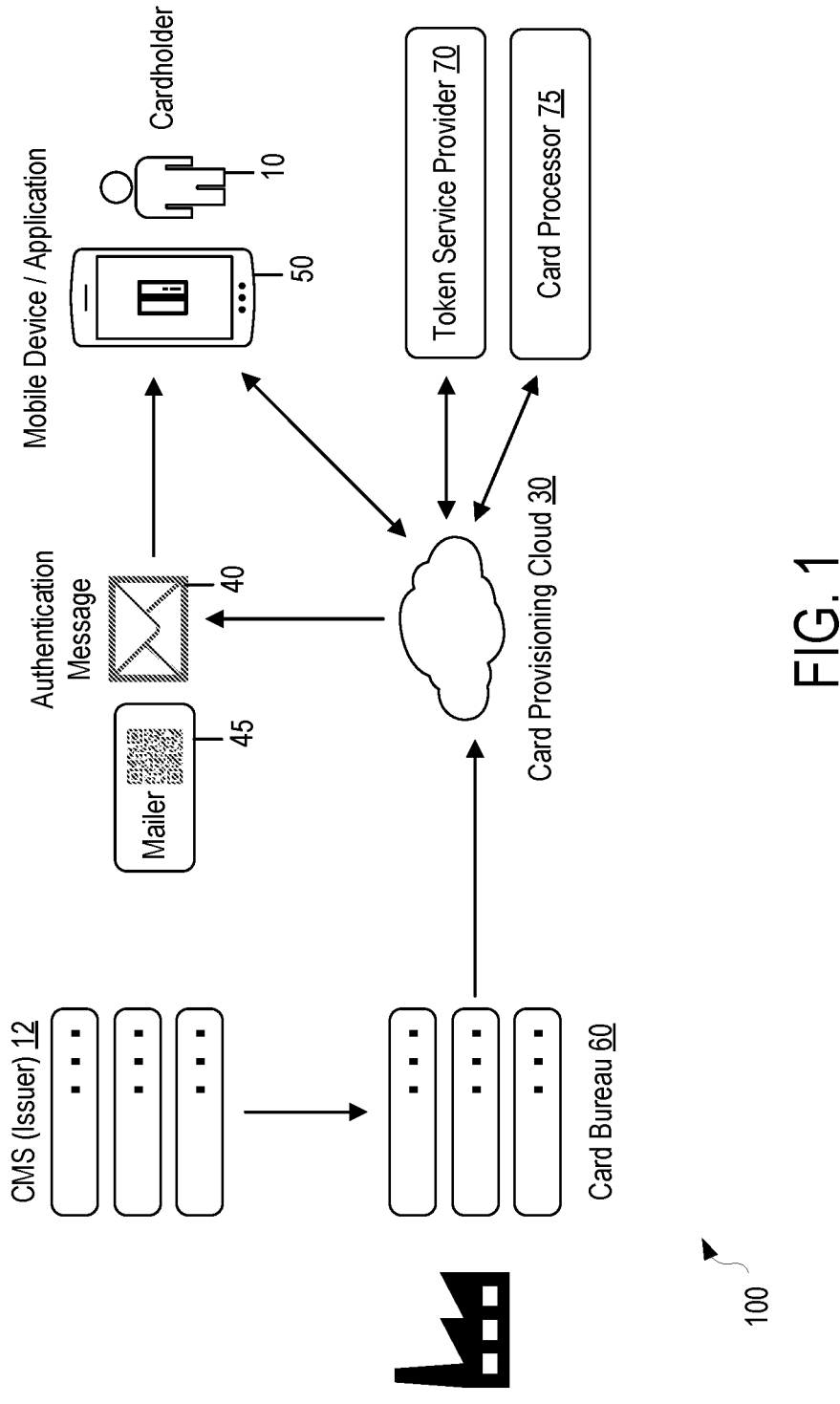
FIG. 1 illustrates an example block diagram of a physical and digital payment card issuance system, in accordance with example embodiments.

In accordance with aspects of the present disclosure, a process for integrating physical payment card and digital payment card issuance is provided. In example aspects, current data flows for physical payment card creation are enhanced by adding digital payment card enrollment procedures that may be performed in association with issuance of the physical payment card.

In example embodiments, a card issuer may issue a batch of payment cards (for example, credit or debit cards) for use by customers (also referred to herein as "cardholders" or "users"). Each payment card may include a primary account number (PAN), as well as an expiration date. In particular embodiments, the card data that is required for issuance of both a digital and physical payment card may also include a client identifier and a phone number. One of skill in the art will recognize that the invention is not limited to batch issuance of payment cards and that embodiments exist and are contemplated where a single payment card may be issued.

In examples, a batch process may be performed to provide the PAN, the expiration date, the client identifier, and the phone number, to a card bureau. The card bureau may encrypt the received data, including the PAN, expiration date, client identifier, and phone number. The card bureau may also generate a link including the encrypted card data, for transmission to a customer (e.g. a recipient of the physical and digital payment card).

In example embodiments, a customer will receive the message or indicia, which corresponds to an activation link. The message can include a text message and may have within it a link to an activation URL. In other embodiments, the physical card issued to the customer can have a QR code printed thereon (e.g., an example of a physical code), or on a sticker (or mailer associated therewith), allowing the user to scan the QR code which reflects an embedded link. In some embodiments, the sticker can be a label, such as an activation label, attached to a surface of the physical payment card, while the mailer can be a card carrier (i.e., form that carries the card) or any other form or document provided with physical payment card to the customer.

The link provided to the customer redirects the customer such that a banking application installed on the customer mobile device will visit the URL. In examples, if the customer does not yet have the mobile banking application installed on his or her mobile device, the customer may be prompted to install that mobile banking application.

In examples, the mobile banking application includes a software development kit (SDK) that is associated with a card provisioning service. The embedded link allows the SDK to communicate with the card provisioning service to perform card provisioning of the digital, or virtual, payment card. In particular, encrypted card data and a client identifier are provided for use as the digital payment card.

The card provisioning service may then finalize the provisioning process for the digital card, for example by decrypting the card data received via the link from the mobile banking application, and a client ID of the specific customer may be verified with a token service provider and/or a card processor.

A card issuer may wish to issue a digital card to a cardholder and may wish to initiate this digital card issuance process at any of a variety of times in association with physical card issuance. For example, depending on the method by which cardholder information is exchanged (i.e., in the various embodiments below), the card issuer may wish to initiate digital card issuance at the time personalization of a physical payment card is initiated, or at the time of mailing of the physical payment card. In other examples, the initiation of digital issuance may begin upon the cardholder's receipt of a physical payment card. Accordingly, the present disclosure is directed to issuance of a digital card in association with issuance of such a physical payment card, in that the issuance occurs in conjunction with the issuance of that physical card, rather than at a particular time during the process of physical payment card issuance.

In accordance with such embodiments, the present disclosure provides a number of advantages over existing digital and physical card issuance systems. For example, the present approach integrates digital card issuance with physical card issuance, thereby allowing a card bureau or physical card issuer to also manage issuance of the digital card. Since the card issuer may control or manage the payment network used by the card, it may be more straightforward for physical and digital cards to be managed similarly. Additionally, the processes described herein improve the speed with which a digital card may be made available to a cardholder, who may otherwise (in some examples) need to wait for receipt of a physical card before being able to register that physical card individually from within some third-party digital payment card management mobile application and environment.

FIG. 1 illustrates an example block diagram of a physical and digital payment card issuance system 100, in accordance with example embodiments. In the example shown, a physical payment card, such as a credit card, may be issued to a cardholder 10 by a card issuer 12, e.g., at a card management system. The card management system is also referred to herein, for simplicity, as the card issuer. In association with issuance of the physical payment card at card bureau 60, which can involve equipment such as the MX series of issuance systems and MXD card delivery systems, both available from Entrust Corporation (Shakopee, MN), the card issuer 12 may wish to enable the cardholder 10 to create a digital representation of that same payment card, for example within a mobile application executing on a mobile device 50 of the cardholder 10.

In examples, cardholder data, such as a primary account number (PAN), and expiration date, a cardholder identifier, and cardholder contact information (e.g., an email address or mobile phone number) may be provided at the card issuer 12. For example, the cardholder data may be provided from a card management service, for example a banking institution or other entity that wishes to issue payment cards. In this instance, the card bureau may correspond to the creator of the physical payment card. In some instances, a card issuer 12, such as a banking institution, may act as its own card bureau. In other instances, the card bureau 60 may be a separate institution that operates to personalize and issue the payment card on behalf of the card issuer 12.

The card issuer 12 may, in response to receipt of the cardholder data used for issuance of the physical payment card, transmit cardholder data to a digital card enrollment service, such as a digital card enrollment cloud service 30. This may be done, for example, via the card bureau 60. The cardholder data transmitted to the digital card enrollment cloud service 30 may include the PAN, the expiration date, the cardholder identifier, and the cardholder contact information.

The digital card enrollment cloud service 30 may be integrated at the card bureau or may be separate from the card bureau 60. The digital card enrollment cloud service 30 may also be integrated with other services. Generally speaking, the digital card enrollment cloud service 30 operates to secure at least a portion of the cardholder data received from the card issuer 12, for example to validate the cardholder and to enable digitizing the payment card information upon interaction with a mobile device 50 on which the digital payment card will be enabled, and confirmation of an identity of the cardholder 10 using the mobile device In some example embodiments, the digital card enrollment cloud service 30 may encrypt and store at least a portion of the cardholder data, and may store that encrypted data for later validation of either the payment card information or the client identifier. Details regarding this process are provided below in conjunction with example message flow diagrams of FIGS. 3-8.

In example implementations, the digital card enrollment cloud service 30 (referred to in FIG. 1 as a "card provisioning cloud") is operable to transmit a message to the cardholder that may be used to initiate a card digitization process. In example implementations, the message may include a link that may be selected by the cardholder to initiate the card digitization process. The link can be included within, for example, a text message or email message (referred to generally as an authentication message, for example issued by a messaging system 40), or may be implemented by a mailer 45, for example by embedding link information within a QR code printed thereon. Depending on the manner of delivery of the link, the timing at which the message is transmitted to the cardholder may vary. By using mobile device 50 to select the link (e.g., by clicking on a link in the text message or email message, or capturing the QR code with a camera of the mobile device), the mobile device may visit a uniform resource locator (URL) that refers the mobile device 50 to the digital card enrollment cloud service 30 to initiate a card digitization process.

In some examples, the link may include embedded within it at least a portion of the cardholder data. For example, the link may embed within the URL a portion of the cardholder data including a client identifier and at least some encrypted card data. Accordingly, when a mobile device 50 is used to navigate to the link, the mobile device 50 may transmit the relevant portion of the cardholder data to the digital card enrollment cloud service 30 for validation of the cardholder data and/or card data.

In some further embodiments, the card digitization process may include a finalizing process in which the digital card enrollment cloud service 30 communicates with a token service provider 70 (e.g., Visa, MasterCard, or the like). The digital card enrollment cloud service 30 may compare cardholder identification data against that held by the token service provider 70, for example to validate the cardholder. In addition, in some instances, the digital card enrollment cloud service 30 may communicate with a card processor 75. The card processor 75 may be the same entity as the token service provider 70; however, in other examples, a separate token service provider may be used, relative to the card processor 75.

Upon completion of the provisioning, a cardholder may receive a physical payment card in the mail from the card issuer 12, and may also receive, within a mobile application on his or her mobile device 50, a digital version of that same payment card. By initiating both physical and digital issuance processes, the overall process is significantly simplified, and the delay with which a digital payment card is made available to the cardholder is significantly reduced.

Figure 2:
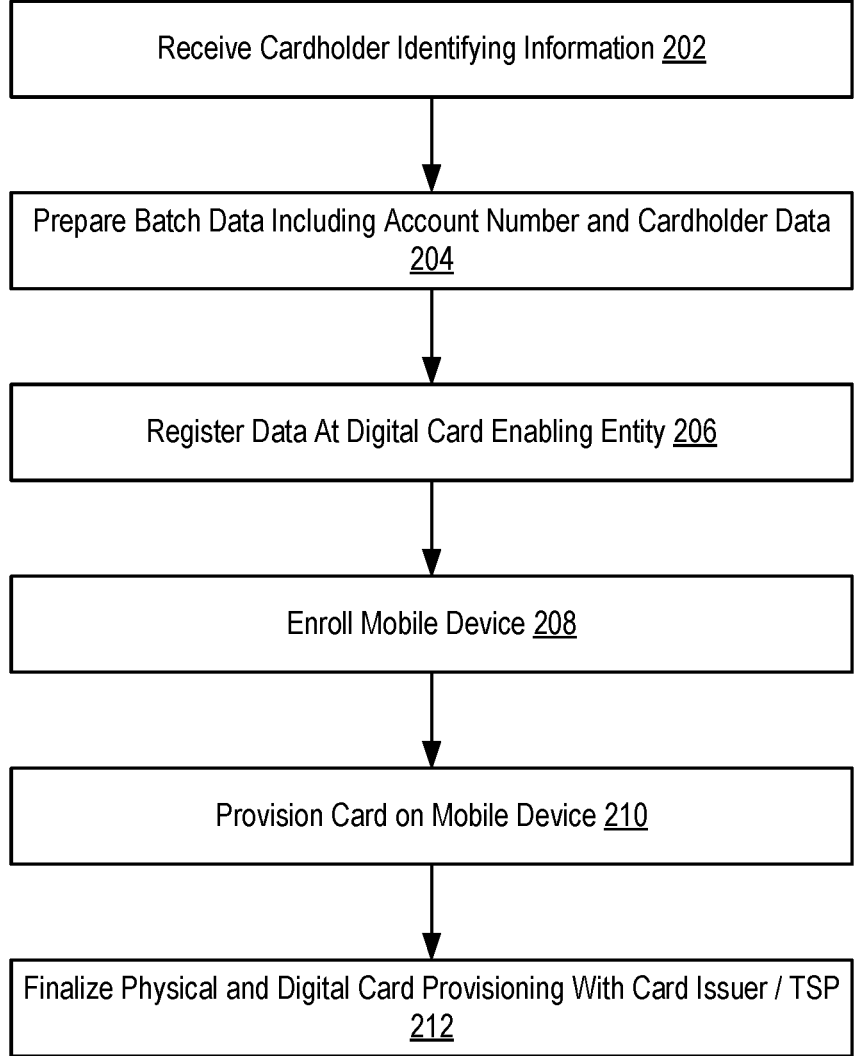
FIG. 2 illustrates an example flowchart of a method of issuing a physical and digital payment card, in accordance with example embodiments.

FIG. 2 illustrates an example flowchart of a method 200 of issuing a physical and digital payment card, in accordance with example embodiments. The method 200 may be performed within the system 100 described above in conjunction with FIG. 1.

In the example shown, the method 200 includes receiving cardholder identifying information, for example as a batch file from a card issuing institution (step 202). The cardholder identifying information may include a cardholder identifier and contact information, such as a mobile phone number or email address, or mailing address as noted above. Generally speaking, because card issuing institutions will issue batches of physical payment cards, the cardholder identifying information may be received at a card issuer in a batch with other cardholder identifying information of other cardholders.

In the example shown, the method 200 further includes preparing the batch data, including an account number (e.g., a PAN) as well as the cardholder data, such as the cardholder identifier and contact information (step 204). Preparing the batch data may include selecting a subset of the data received for issuance of physical cards for submission to a digital card enrollment cloud service to enable digital card issuance as well.

In the example shown, the method 200 also includes registering the received data at a digital card enabling entity (step 206). As noted above, the digital card enabling entity may be a digital card enrollment service, such as digital card enrollment cloud service 30 of FIG. 1, or may be integrated within a card bureau (e.g. card bureau 60), or card issuer (e.g., card issuer 12). In some instances, registering the received data may correspond to encrypting and signing the received cardholder data. In alternative embodiments, registering the received data may include splitting the data into first and second portions, with a first portion being retained at the digital card enabling entity and the second portion transmitted as part of a message to the cardholder. In such alternative embodiments, as described below, the first and second portions each obscure the cardholder data, but may be recombined to reformulate the cardholder data.

In the example shown, the method 200 further includes enrolling a mobile device (e.g., mobile device 50) as carrying a digital version of the physical payment card (step 208). Enrolling the mobile device may correspond to receipt of an indication from the mobile device of a request to digitize the physical payment card, thereby creating a digital representation of that physical payment card. The request may be generated at the mobile device in response to selection of the link included within a message that is transmitted to the cardholder. Enrolling the mobile device may also include determining, at the mobile device, whether a compatible mobile application is installed at the mobile device. If a compatible mobile application is installed, that mobile application may be enabled to provide secure communication between the mobile device and the digital card enabling entity, e.g., the digital card enrollment cloud service. If no compatible mobile application is installed, enrolling the mobile device may include prompting the cardholder to download and install an appropriate mobile application from one or more publicly available mobile application libraries (e.g. the Apple App Store or Google Play).

In the example shown, the method 200 also includes provisioning the digital payment card on the mobile device (step 210). Provisioning the digital payment card on the mobile device may include validating either cardholder information or card data, or both, by comparison of information at the mobile device and information stored at the digital card enabling entity. In some instances, provisioning the digital payment card includes validating both the cardholder information and the card data, and subsequently digitizing the card at the digital card enabling entity. Digitizing the card may include generating a virtual credit card number that is different from the physical credit card number, and generating one or more tokens for mapping and exchange between the digital card enabling entity and the mobile application on the mobile device. One or more additional card and or device eligibility checks may also be performed as part of the digitization process.

In the example shown, the method 200 further includes finalizing the provisioning of the physical and digital cards with the card issuer (step 212). This can include downloading relevant digital card information from the digital card enabling entity to the mobile application for storage, validating user identities with a credit bureau or card issuer, and sending confirmation of successful digital card issuance to one or more such entities.

It is noted that, in some embodiments, the order of steps described above may vary, depending on the manner and timing of digitization of a virtual payment card compared to specific steps in the issuance process for a physical payment card. In various embodiments, the digitization process may begin at any time after the PAN data is received, at step 204.

Furthermore, the digitization process may be initiated at any time up to or after the physical payment card is received by the cardholder.

Referring now to FIGS. 3-9, a set of specific message flow diagrams are provided that illustrate various optional ways in which a digital payment card may be issued to a cardholder in association with issuance of a physical payment card. Such message flow diagrams are generally initiated at a point of receiving cardholder data from a card issuing institution, such as a banking institution, for purposes of issuing the physical payment card. While typically issuance of a physical payment card requires receipt of account and expiration information for a particular cardholder, the processes described herein require a card issuer to also receive cardholder identification information and contact information of the cardholder to enable the digital payment card issuance process (also called a card digitization process).

Figure 3:
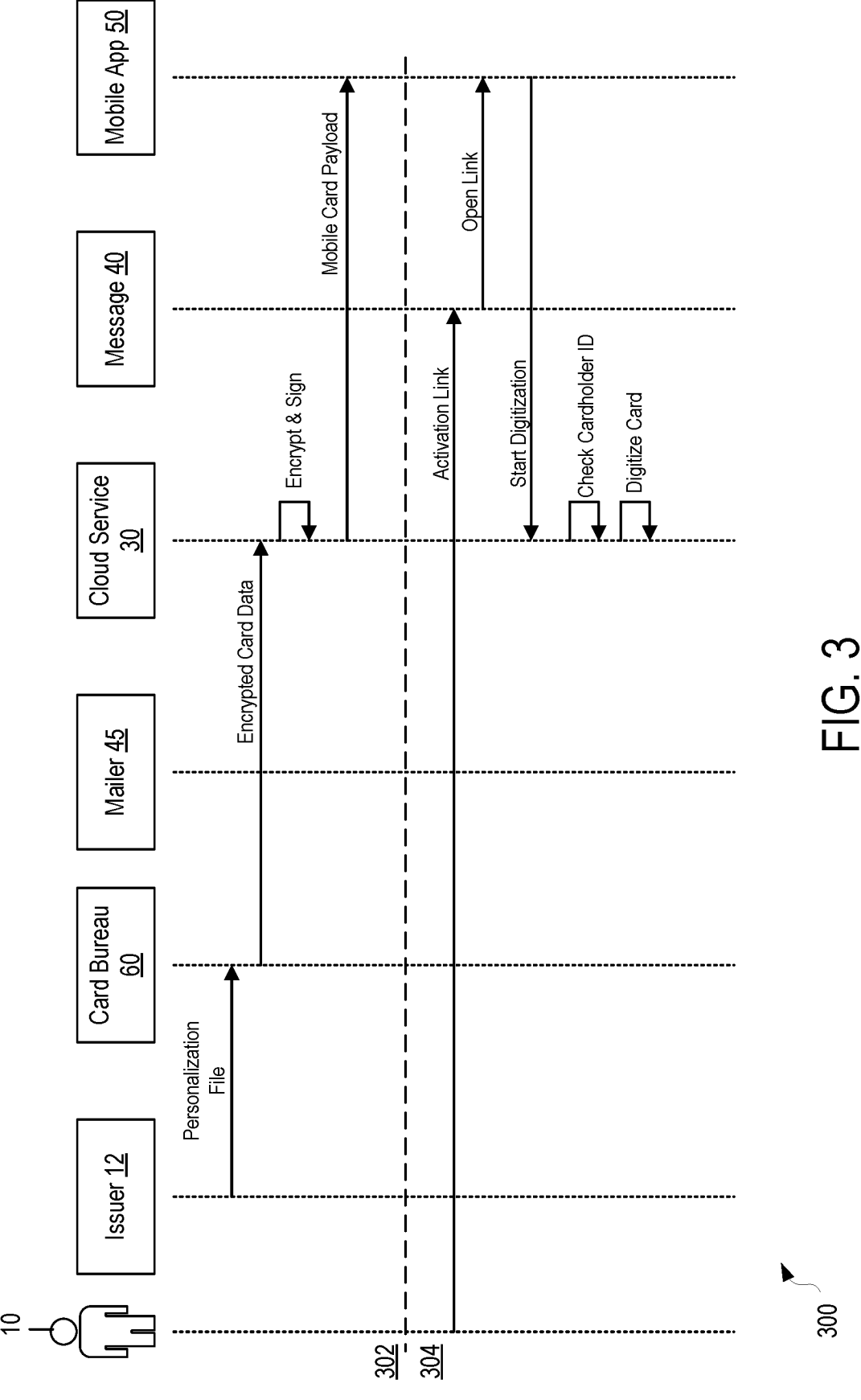
FIG. 3 is an example message flow diagram showing integration of digital card enrollment using an electronic message sent to the cardholder, in which a mobile application associated with the issuing institution is utilized.

FIG. 3 is a first example message flow diagram 300 showing integration of digital card enrollment using an electronic message sent to the cardholder, in which a mobile application associated with the issuing institution is utilized. The example message flow diagram 300 is illustrated as including a card data preparation process 302 and a card digitization process 304, among the entities described above in conjunction with FIG. 1.

In the example shown, the card data preparation process 302 is initiated when and issuer bank sends a personalization file to a card bureau 60, for example for creation of one or more physical payment cards. The personalization file may include, for example, a primary account number (PAN), and expiration date of the physical payment card, a cardholder identifier, and optionally a cardholder contact information, such as an email address or her mobile device phone number. The card bureau 60 may then send to a digital card enrollment service, such as cloud service 30, encrypted cards data, including an encrypted version of the PAN, the expiration date, some other optional cryptographic components, and the cardholder identifier. The cloud service 30 may then encrypt and sign the received encrypted card data, thereby forming a card payload. The card payload may be sent from the cloud service 30, as a message, to a cardholder. For example, the card payload may be embedded within a link included within an email or text message, in the embodiment described here.

Figure 12:
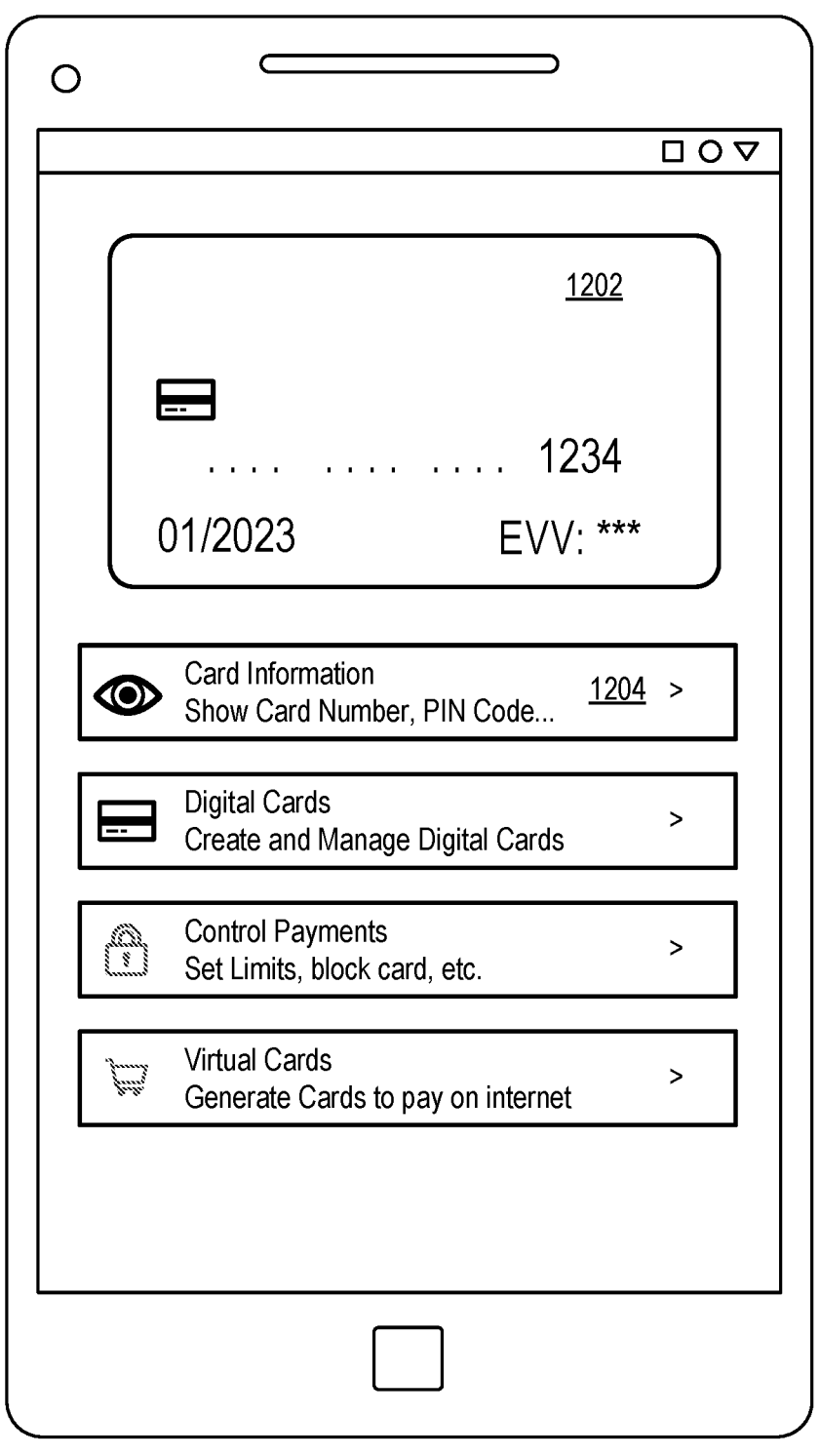
FIG. 12 illustrates an example mobile device on which a mobile application implementing a digital payment card may be used and managed.

During the card digitization process 304, a customer (shown as cardholder 10) may select the link within the received email or text message, for example by clicking on the link (e.g., a URL) provided, using his or her mobile device 50. The customer mobile device 50 may initiate a digitization process, by receiving the encrypted card payload which was included within the link. The mobile device 50, via a mobile application installed thereon, will transmit a request to the cloud service 30 to start the digitization process, by sending, as digital issuance information, the encrypted card payload alongside the cardholder identifier. The cloud service 30 may then check the cardholder identifier against a stored cardholder identifier that was captured during the card data preparation process 302. If the cardholder ID matches, a digitization process creates cryptographic objects, such as tokens and the like, stores cryptographic information in association with the cardholder, and publishes card information to the mobile device 50. Accordingly, subsequently, the cardholder may use his or her card within the associated mobile application, e.g., as seen in FIG. 12, below.

Figure 4:
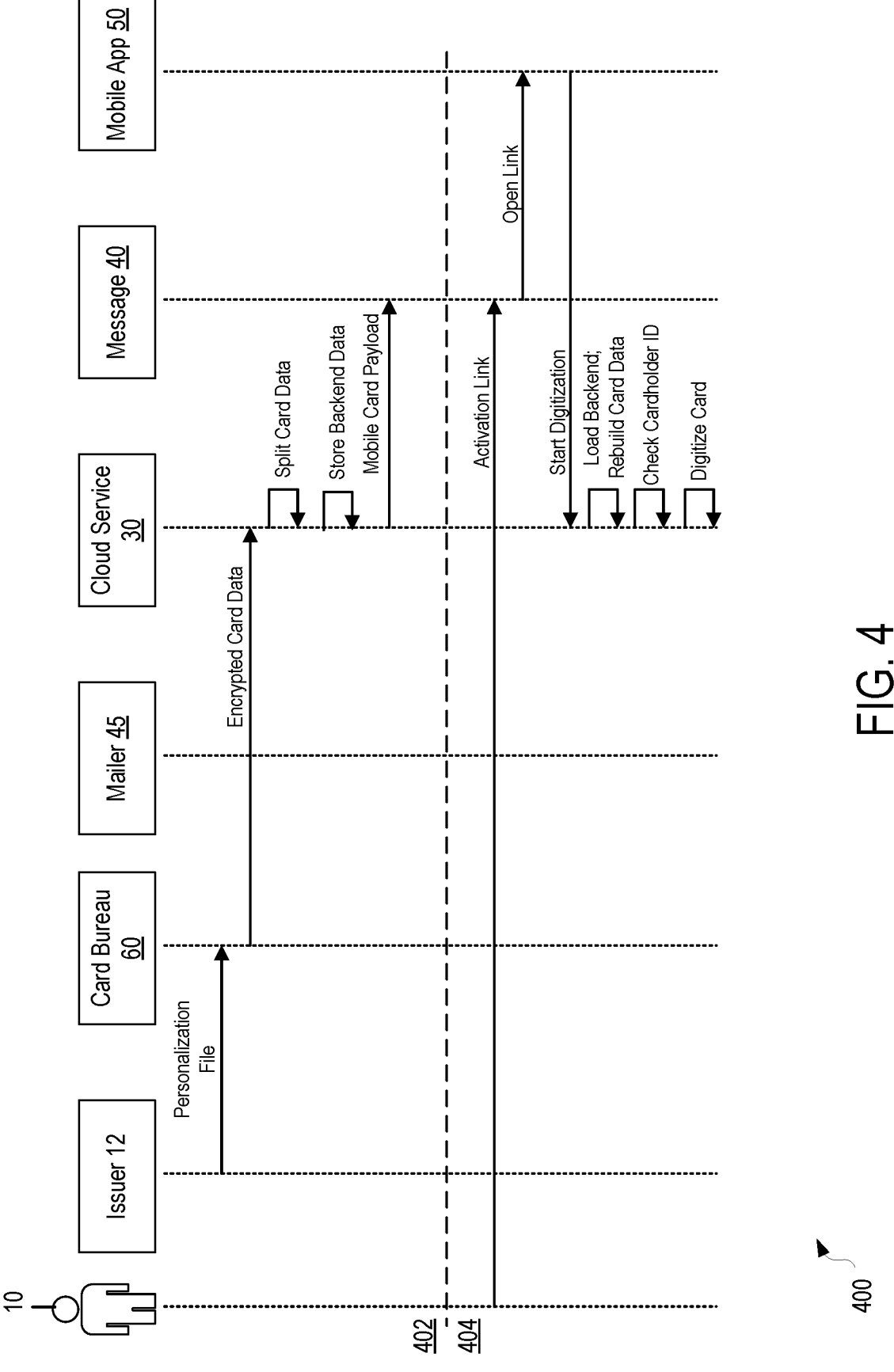
FIG. 4 is an example message flow diagram showing integration of digital card enrollment using an electronic message sent to the cardholder, in which a mobile application associated with the issuing institution is utilized, according to an alternative embodiment.

FIG. 4 is an example message flow diagram 400 showing integration of digital card enrollment using an electronic message sent to the cardholder, in which a mobile application associated with the issuing institution is utilized, according to an alternative embodiment. The example message flow diagram 400 is illustrated as including a card data preparation process 402 and a card digitization process 404, among the entities described above in conjunction with FIG. 1.

Generally speaking, the card data preparation process 402 is similar to the card data preparation process 302 of FIG. 3, except that when encrypted card data is received at the cloud service 30, rather than encrypting and signing that data, instead the cloud service will split the card data into first and second portions. The first and second portions each obscure the digital issuance information (as would occur during encryption); however, in this instance, neither the first nor the second portion is adequate to reconstitute the encrypted card data. Rather, a combination of the first and second portions (e.g., using a bitwise exclusive-or, or XOR operation) may reconstitute the digital issuance information. Additionally, one of the two portions of the encrypted card data is stored at the cloud service, and the other of the first and second portions is embedded within the link included in the message to the cardholder mobile device, as discussed above.

Accordingly, the card digitization process 404 is similar to the card digitization process 304 discussed above, except that, upon receipt of a request to digitize the card at the cloud service (e.g., triggered by the mobile application at mobile device 50, the cloud service will first reconstitute the digital issuance information, for example by retrieving a stored portion of the digital issuance information stored at the cloud service in association with a unique identifier also associated with the link, and then using an XOR operation on the first and second portions to reconstitute the digital issuance information. Then, the card digitization process can include validating the cardholder ID and performing digitization as discussed previously. Of course, in some examples, cardholder validation may occur prior to reconstituting the digital issuance information, if the customer ID is available separately from the digital issuance information.

Figure 5:
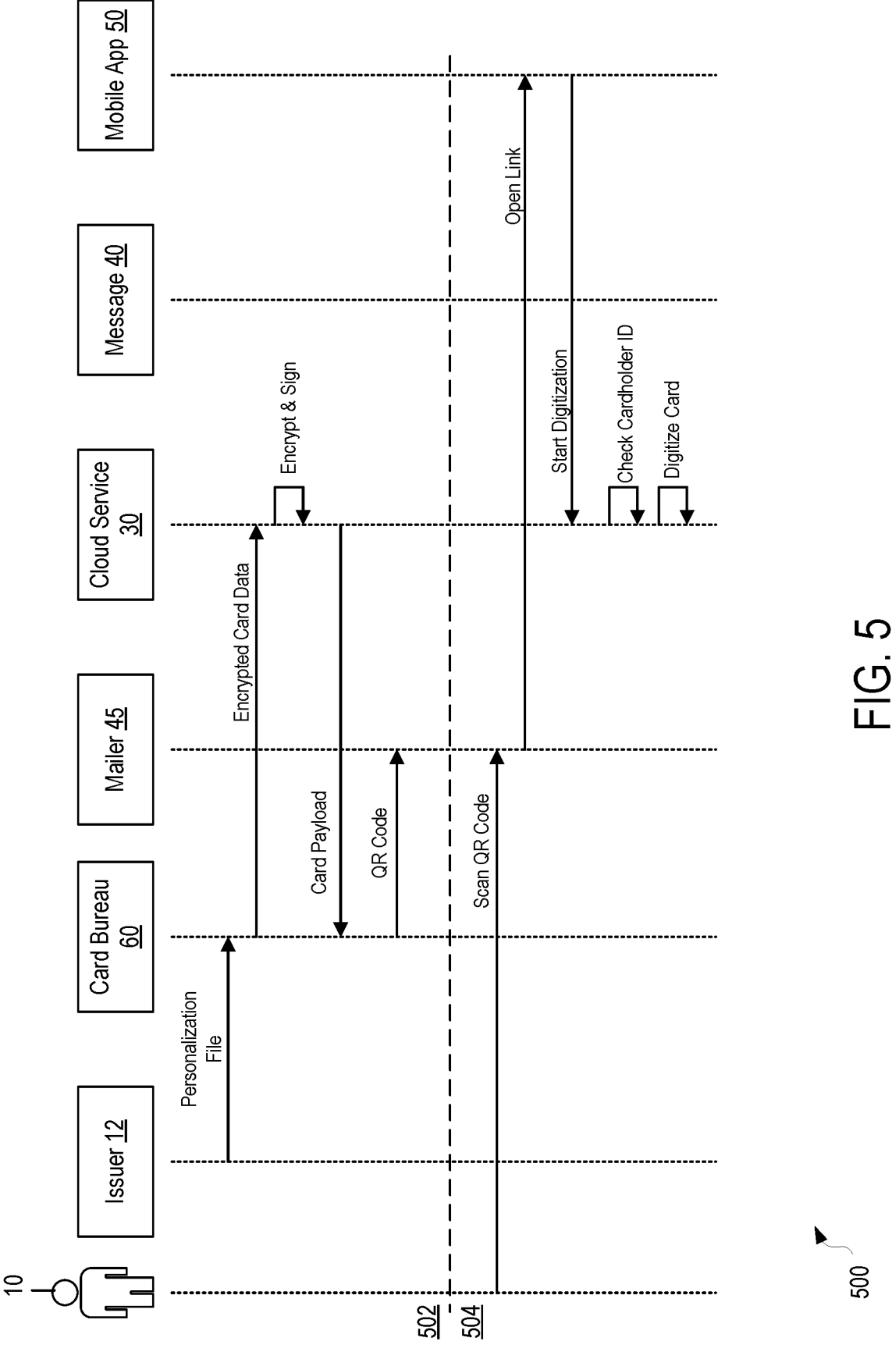
FIG. 5 is an example message flow diagram showing integration of digital card enrollment using a physical mailer sent to the cardholder, in which a mobile application associated with the issuing institution is utilized.

FIG. 5 is an example message flow diagram 500 showing integration of digital card enrollment using a physical mailer sent to the cardholder from the card digitization cloud service, in which a mobile application associated with the issuing institution is utilized. The example message flow diagram 500 is illustrated as including a card data preparation process 502 and a card digitization process 504, among the entities described above in conjunction with FIG. 1.

In this example, the card data preparation process 502 and card digitization process 504 are similar to the analogous processes 302, 304 of FIG. 3, but instead of sending a message to the mobile device 50 of the cardholder, a mailer 45 may be used with an embedded QR code. The mailer, such as a PIN mailer or card mailer, may be a secure mail service, e.g., a service that typically would mail a physical payment cardholder his or her payment card or payment card PIN code. To enable this variation, during the card data preparation process, after the cloud service encrypts and signs the encrypted card data received from card bureau 60, it returns the card payload to the card bureau which generates a QR code having the embedded link including the card payload and a URL pointing to the cloud service.

During the card digitization process, a cardholder 10 who receives the mailed QR code will use his or her mobile device 50 to scan the QR code, which results in the mobile device 50 opening the link embedded in the QR code. The link is analogous to the link included within the text or email message of the card digitization process 304, and can therefore initiate a digitization process by sending a request from the mobile device 50 to the cloud service 30.

In alternative embodiments to that shown in FIG. 5, the QR code may also be used in conjunction with the split card data approach used in FIG. 4, in which one portion (of the first and second portions of the encrypted card data) may be passed back to the card bureau and embedded within the link represented by the QR code. In such an example, by selecting the QR code, the cardholder sends a request that proceeds thereafter in accordance with the analogous card digitization steps described in conjunction with the card digitization process 404.

Figure 6:
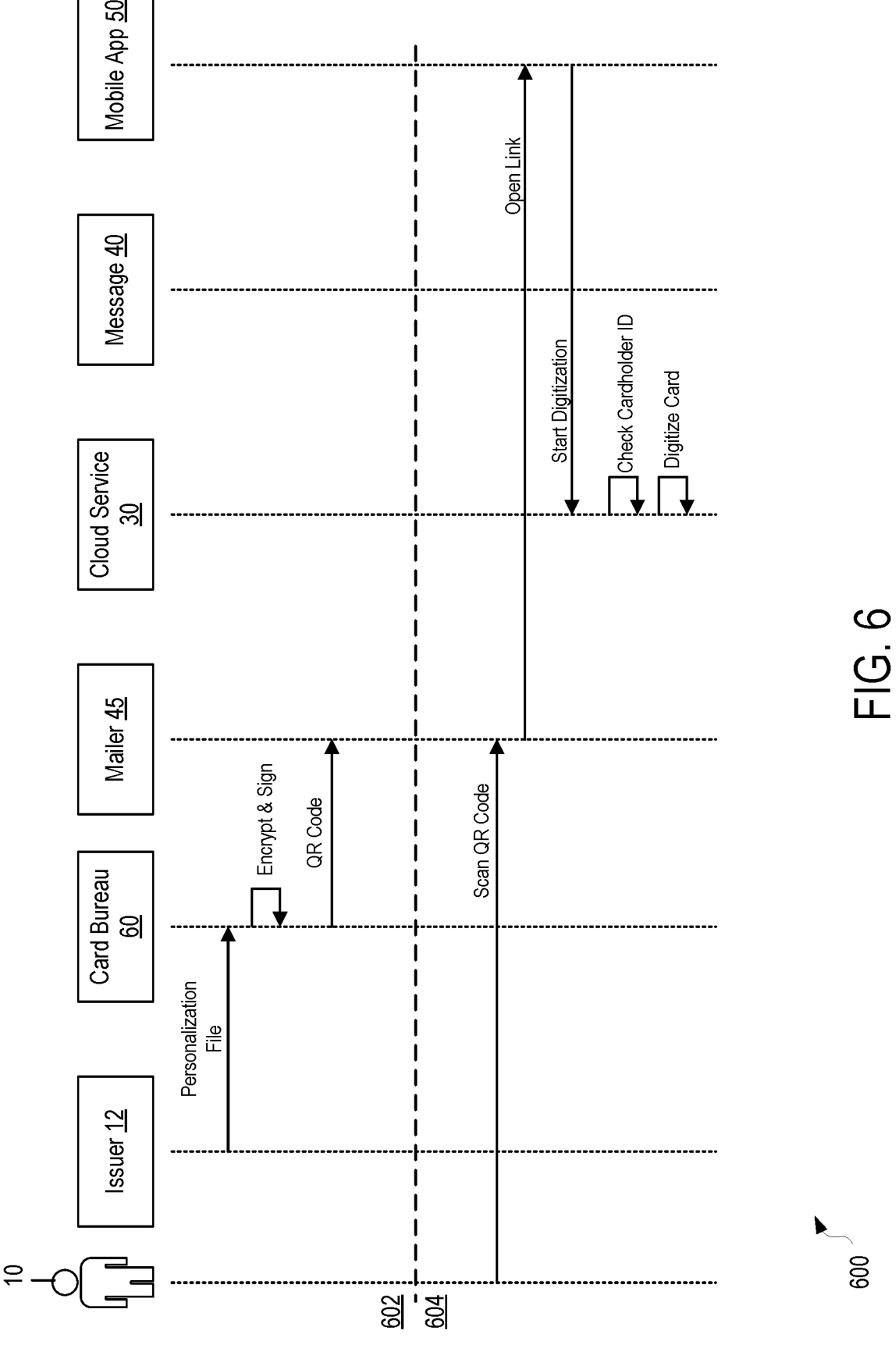
FIG. 6 is an example message flow diagram showing integration of digital card enrollment using a physical mailer sent to the cardholder, in which a mobile application associated with the issuing institution is utilized.

FIG. 6 is an example message flow diagram 600 showing integration of digital card enrollment using a physical mailer sent to the cardholder from the issuer, in which a mobile application associated with the issuing institution is utilized. The example message flow diagram 600 is illustrated as including a card data preparation process 602 and a card digitization process 604, among the entities described above in conjunction with FIG. 1.

In this example, the card data preparation process 602 utilizes a QR code, as in the card data preparation process 502 of FIG. 5. However, in this case, the personalization file is only sent to the card bureau 60, which encrypts and signs the card data for inclusion within the QR code. In this instance, either the card bureau 60 may send the encrypted and signed cards data to the cloud service 30, and will include within the QR code a link to the cloud service, or the card bureau 60 may itself manage digitization. In this example, the card bureau may be integrated with cloud service 30, and therefore may share the encrypted and find information. The card digitization process 604, therefore, is analogous to the card digitization process 504 of FIG. 5.

Figure 7:
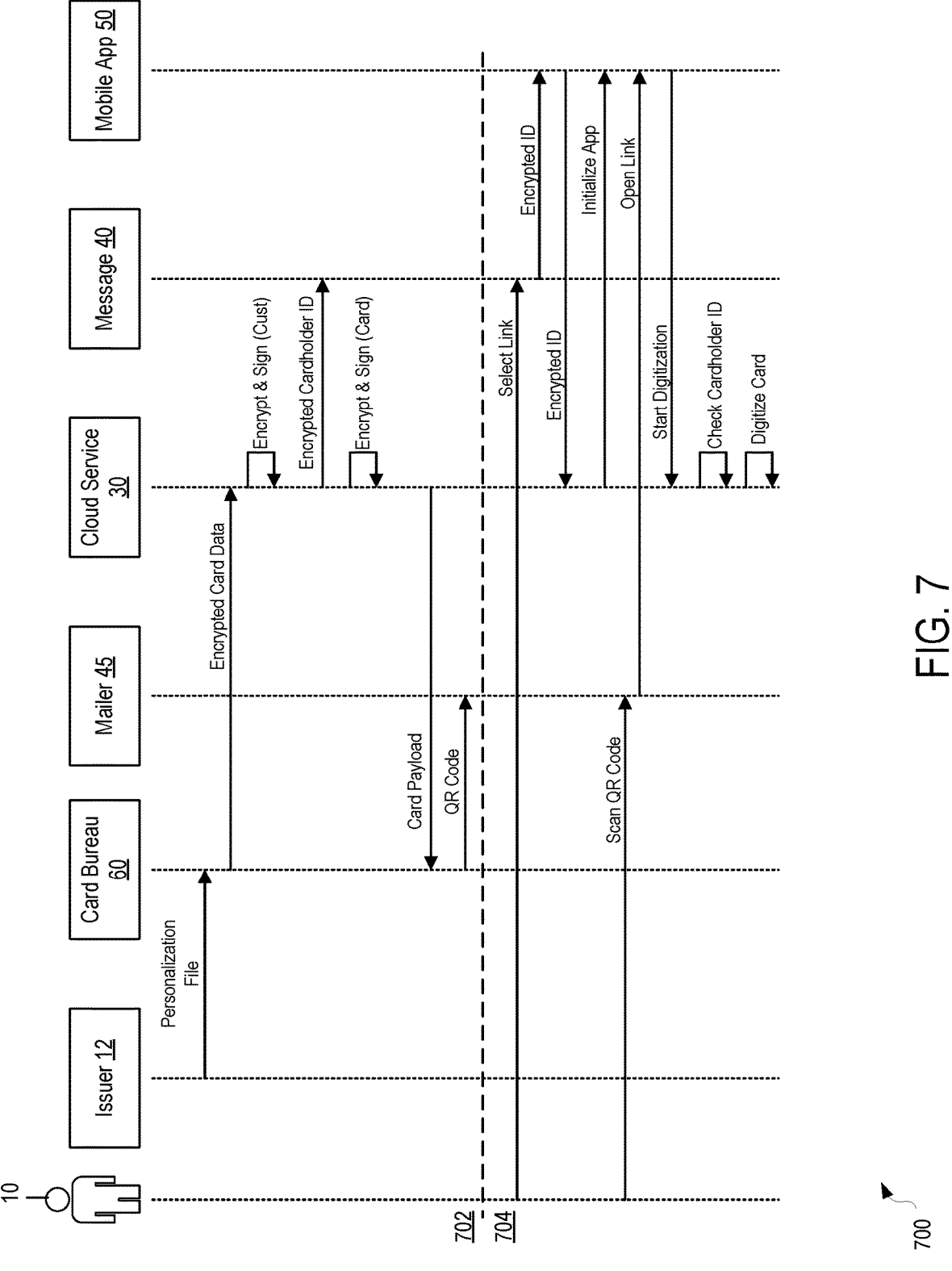
FIG. 7 is an example message flow diagram showing integration of digital card enrollment using both an electronic message and a physical mailer sent to the cardholder are used to validate the cardholder in the event a mobile application unaffiliated with the issuing institution is used.

FIG. 7 is an example message flow diagram 700 showing integration of digital card enrollment using both an electronic message and a physical mailer sent to the cardholder are used to validate the cardholder in the event a mobile application unaffiliated with the issuing institution is used. The example message flow diagram 700 is illustrated as including a card data preparation process 702 and a card digitization process 704, among the entities described above in conjunction with FIG. 1.

In this example, the mobile application installed on mobile device 50 may be a dedicated, or special-purpose, mobile application, as compared to the mobile application used in FIGS. 3-6, which is associated with the issuing bank and therefore is capable of authenticating the cardholder. Because of the use of a dedicated mobile application, it may be desired to use multi factor authentication (MFA) before allowing the purported cardholder to digitize a physical payment card. Accordingly, the card data preparation process 702 involves receiving encrypted card data, and encrypting and signing two separate sets of information at the cloud service 30. A cardholder identifier is encrypted and embedded within a link sent to the cardholder via a messaging system 40, and card data is encrypted and signed, and embedded within a card payload sent to the card bureau 60 for inclusion within a QR code provided to the cardholder via a mailer 45.

The card digitization process 704 includes the cardholder 10 selecting a link included in a received message, which results in the encrypted cardholder identifier being accessed at the mobile device 50, and the mobile device sending the encrypted cardholder identifier to the cloud service 30. The card digitization process 704 also includes the cardholder 10 in a QR code of a mailer 45, resulting in the mobile application opening a link embedded within the QR code (which also includes the encrypted card data), and navigating to the cloud service by sending a digitization request that includes the encrypted card data. Once the cloud service 30 has both the encrypted cardholder identifier and the encrypted card data, it may start the digitization process by decrypting that information, checking the cardholder identifier, and performing the digitization process as described above.

It is noted that, because of the use of both a PIN mailer and card mailer in FIG. 7, the process for digitizing a virtual payment card might not be completed in such an arrangement until after a card mailer is received by the cardholder, i.e., after the cardholder has already received his or her physical payment card. However, in alternative approaches, other mailers may be initiated as well, or one of the other embodiments described above for digital delivery of card data and/or cardholder information may be used.

Figure 8:
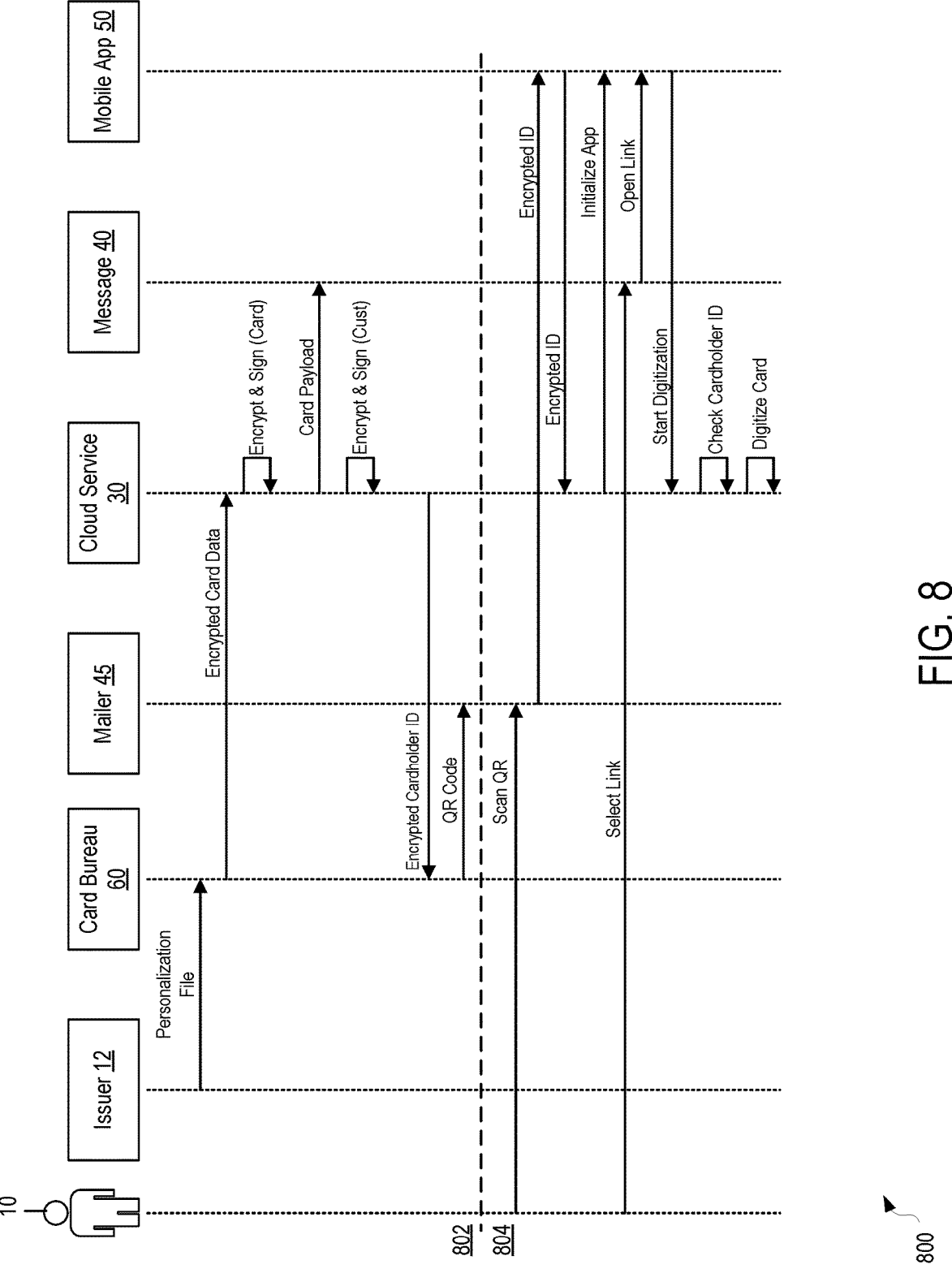
FIG. 8 is an example message flow diagram showing an alternative version of integration of digital card enrollment as compared to the method of FIG. 7.

FIG. 8 is an example message flow diagram 800 showing an alternative version of integration of digital card enrollment as compared to the method of FIG. 7. The example message flow diagram 800 is illustrated as including a card data preparation process 802 and a card digitization process 804, among the entities described above in conjunction with FIG. 1.

In this example, by contrast to the configuration seen in FIG. 7, the card data preparation process 802 and card digitization process 804 are modified by sending the card payload via electronic message from a messaging system 40 and sending the cardholder identifier via the mailer 45. During the card digitization process 804, a cardholder who scans a QR code will cause the customer identifier to be captured using the dedicated mobile application, and that customer identifier may then be sent to the cloud service via the link embedded in the QR code. The cloud service can then initialize the mobile application in accordance with the cardholder identifier, and upon receipt of selection of the link received via a message from a messaging system 40, can initiate the digitization process as discussed previously.

In alternative embodiments of the arrangements seen in FIGS. 7-8, it is also possible to, rather than encrypting and signing card data and cardholder identification information, a split and store process may be used for either or both of those pieces of information, similar to the approach used in FIG. 4. In such instances, the cloud service 30 may store a first portion of either or both of the card data and customer identifier, and may respectively extend the second portion of either or both of the card data and customer identifier via a message or PIN mailer code, respectively.

Figure 9:
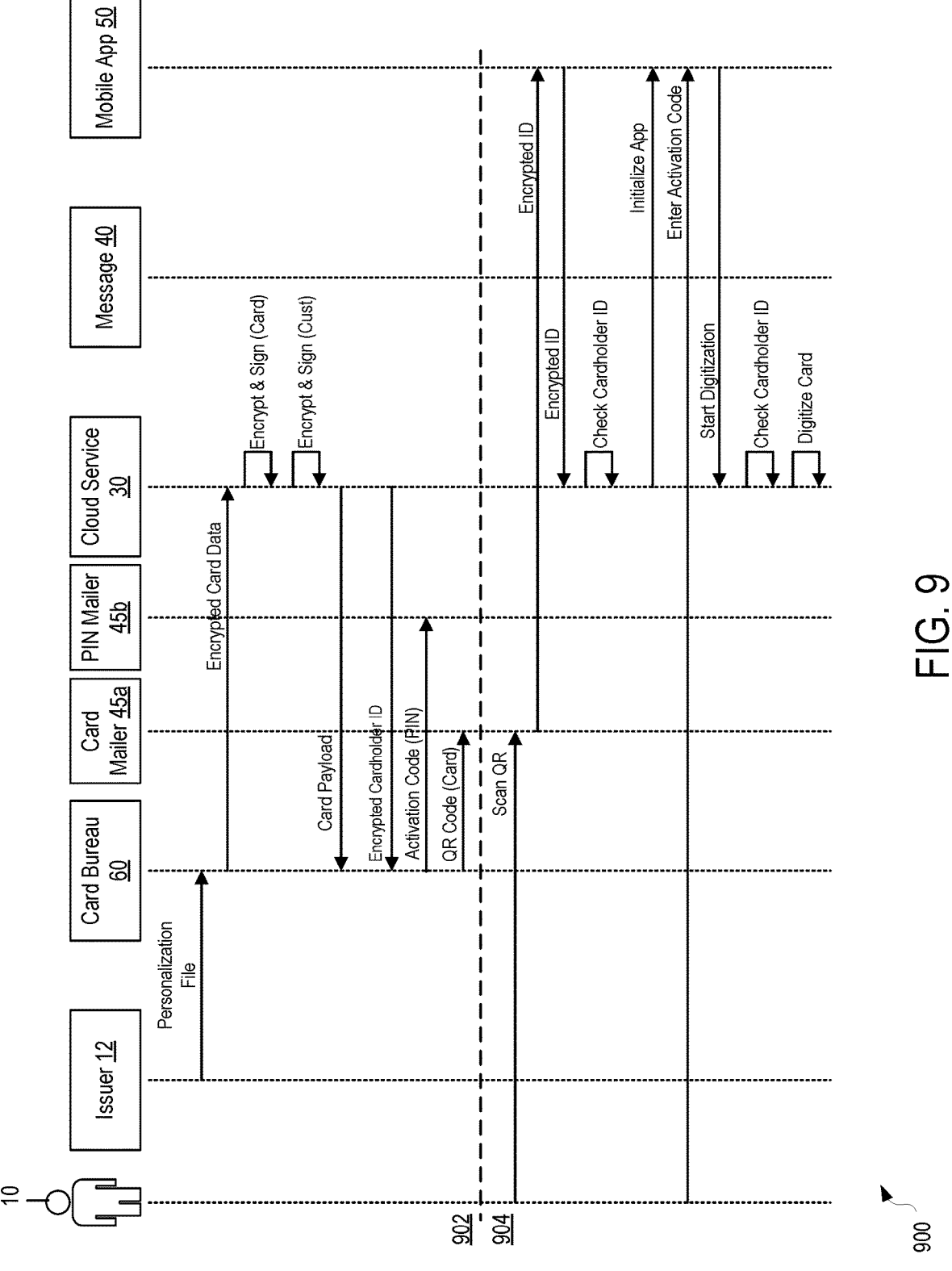
FIG. 9 is a further example message flow diagram showing an alternative version of integration of digital card enrollment as compared to the method of FIGS. 7-8.

FIG. 9 is an example message flow diagram showing a further alternative version of integration of digital card enrollment. The example message flow diagram is illustrated as including a card data preparation process 902 and a card digitization process 904, among the entities described above in conjunction with FIG. 1.

In this example, the card data preparation process 902 involves creation of both a QR code for inclusion on a PIN mailer 45b, and a separate activation code that can be separately mailed with the physical card, e.g., at a card mailer 45a. That is, in this instance, two separate mailer services are used.

In the card digitization process 904, a user will scan the QR code included on the PIN mailer 45b, thereby following an activation link. An encrypted identifier will then be checked at cloud service 30. Upon validation of the identifier, an initialization message from the cloud service 30 can initialize the mobile application of a mobile device 50. The user will directly enter an activation code from the card mailer 45a into the mobile application in response to the activation link. The activation code can be sent to the cloud service 30 for verification, and the digitization process may be allowed to occur thereafter. Accordingly, in this case, the card digitization process may not be able to be completed until after the physical payment card is received by the cardholder.

Referring generally to FIGS. 3-9, it is recognized that additional stems pay be incorporated into one or more of these alternative approaches. For example, upon completion of digitization, a message may be sent from the cloud service 30 to the card issuer to indicate successful provisioning of a digital card, such that the digital card can then be activated by the issuer. Other types of status messages may be exchanged as well, in further alternative embodiments.

Figure 10:
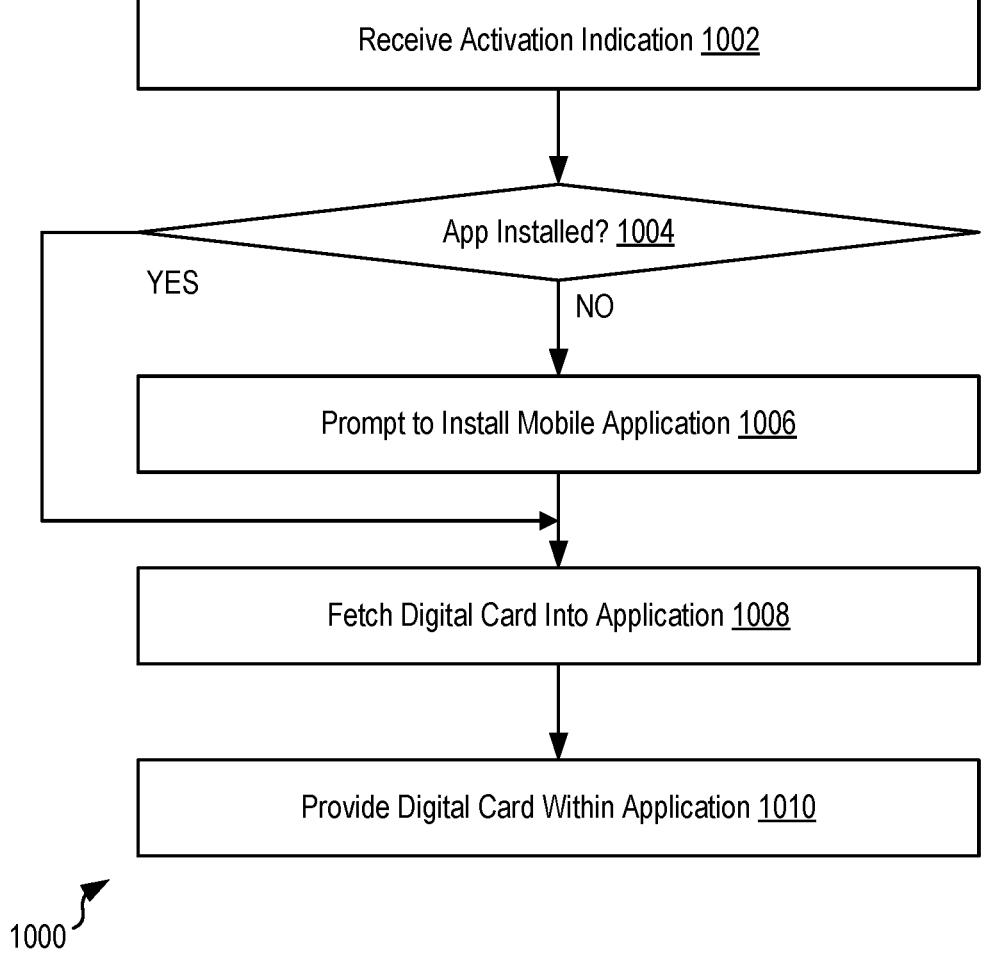
FIG. 10 illustrates an example flowchart of a method of activating a digital card received by a cardholder of a physical card in an integrated flow, according to an example implementation.

FIG. 10 illustrates an example flowchart of a method 1000 of activating a digital card received by a cardholder of a physical card in an integrated flow, according to an example implementation. The method 1000 may be performed, for example, at a mobile device 50, for example to initiate a card digitization process in accordance with any of the above flows.

In the example shown, the method 1000 includes receiving an activation indication from a card issuer. The activation indication can take a variety of forms, but may include either a text message, an email message, or a QR code, or some combination thereof. For example, if only a dedicated application is allowed, one of the QR code or the electronic message may be provided with a link (e.g., a hyperlink) that includes all or a portion of the encrypted card information. If a dedicated application is also allowed, separate QR code and electronic messages may be provided to the cardholder, and received (e.g. received via text or email, or scanned via a camera) at the mobile device 50. An example of a text message received at a mobile device as illustrated in FIG. 11.

As illustrated, the mobile device 50 may determine whether an appropriate mobile application is installed (at operation 1004). If an appropriate mobile application is not installed, the user may be prompted to install such a mobile application (step 1006).

Once an appropriate mobile application is installed on the mobile device 50, the mobile device 50 may initiate a process to fetch the digital card into the application (step 1008). Fetching the digital card into the application can include, for example, sending a digitization request from the mobile application to a service, such as the cloud service 30 described above. The cloud service may then digitize the physical payment card based on information included within the digitization request (e.g., an encrypted cardholder ID, encrypted card information, and the like as described above). Based on information received from the cloud service 30, the mobile application may then provide the digital payment card within the application (step 1010). In example illustration of providing the digital payment card within a mobile application is shown in FIG. 12.

Figure 11:
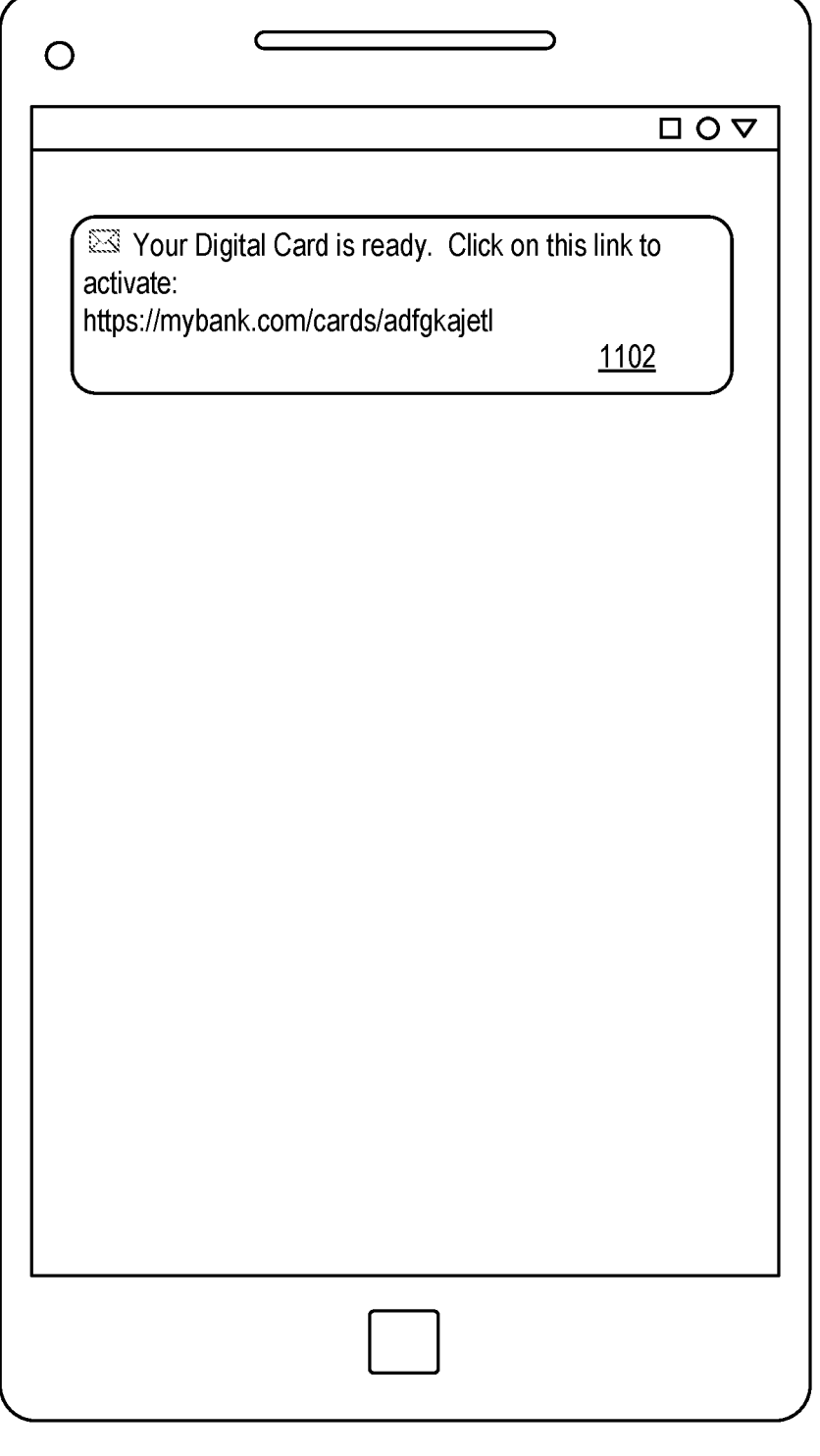
FIG. 11 illustrates an example mobile device on which an activation message may be delivered and displayed within a user interface, according to an example embodiment.

FIG. 11 illustrates an example mobile device 1100 on which an activation message may be delivered and displayed within a user interface, according to an example embodiment. In this example, the mobile device 1100 represents an example of mobile device 50, and presents on a display a text message 1102 that indicates to the cardholder that a digital card is available to them for activation. The text message 1102 can include within it a link that includes a portion having embedded card data or cardholder identification, such that selection of the link addresses the mobile device to the cloud service 30, which can, cooperatively with the mobile device, determine whether an appropriate mobile application is installed to subsequently perform the digitization process.

FIG. 12 illustrates the example mobile device 1100 on which a mobile application implementing a digital payment card may be used and managed. In this instance, the mobile device 1100 presents a subsequent screen after the user selects the link included within the message 1102, and digitization is performed at the cloud service 30. In this instance, a digital payment card 1202 is presented on the display of the mobile device 1100. Additional options 1104 may also be presented, such as the ability to view card information such as a card number, PIN code and the like; create and manage other digital cards; control payments, such as setting spending limits blocking card payments and the like; and creating virtual cards for use in payment on the Internet. Other example features of a digital payment card may be provided here as well. Each of the options may be based on communication between the mobile application on the mobile device 1100 and a supporting service, such as the cloud service 30, for assisting with tokenization and secure storage of payment credentials.

Figure 13:
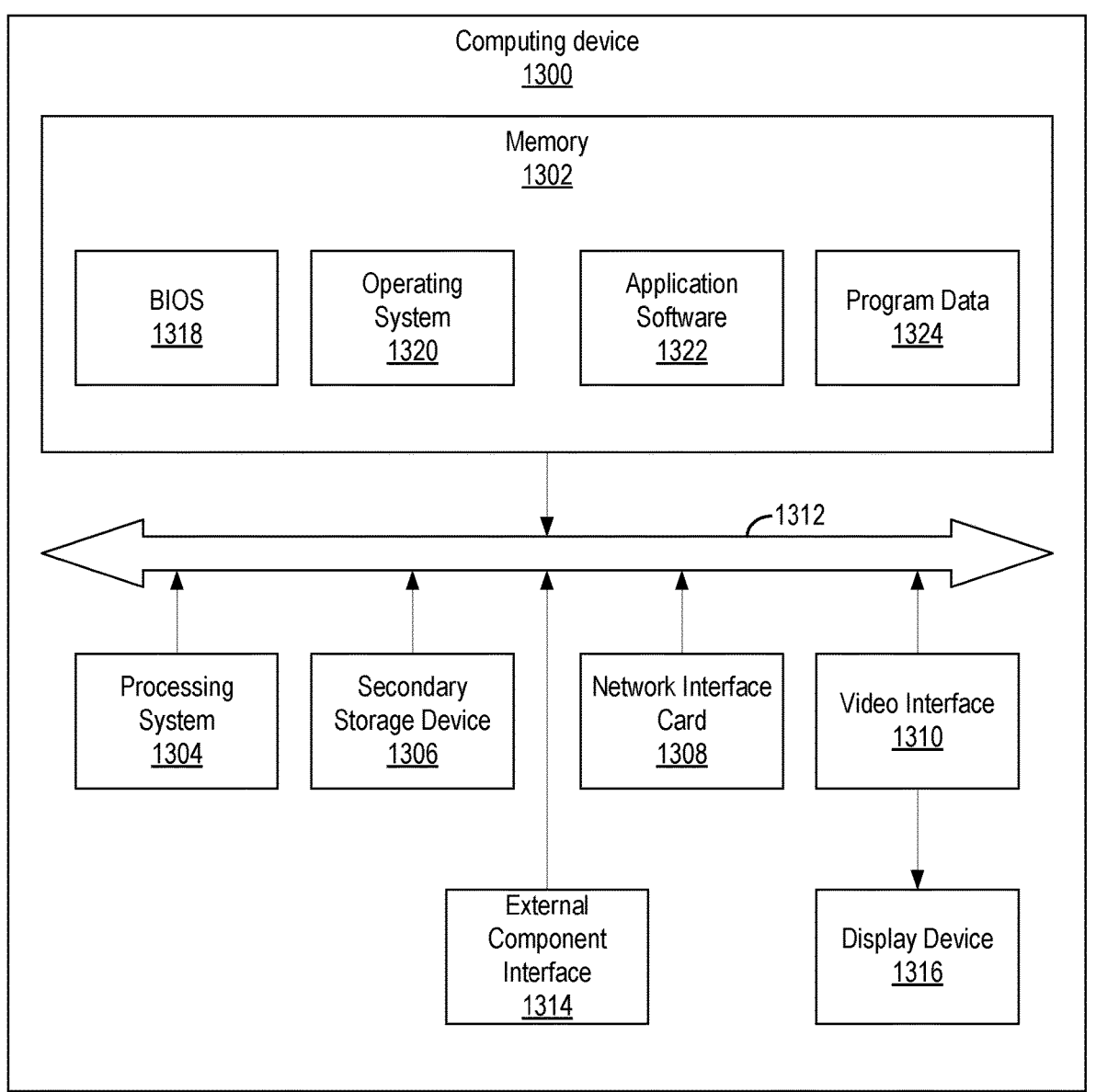
FIG. 13 illustrates an example computing system on which aspects of the present disclosure may be implemented.

FIG. 13 illustrates an example computing system 1300 on which aspects of the present disclosure may be implemented. The computing device 1300 can be used, for example, to implement computing devices such as the mobile device 50, 1100, or various server or cloud-based computing systems, such as that of a card bureau 60, the cloud service 30, card issuer 12 or any other computing device useable as described above in connection with FIG. 1.

In the example of FIG. 13, the computing device 1300 includes a memory 1302, a processing system 1304, a secondary storage device 1306, a network interface card 1308, a video interface 1310, a display unit 1313, an external component interface 1314, and a communication medium 1316. The memory 1302 includes one or more computer storage media capable of storing data and/or instructions. In different embodiments, the memory 1302 is implemented in different ways. For example, the memory 1302 can be implemented using various types of computer storage media, and generally includes at least some tangible media. In some embodiments, the memory 1302 is implemented using entirely non-transitory media.

The processing system 1304 includes one or more processing units, or programmable circuits. A processing unit is a physical device or article of manufacture comprising one or more integrated circuits that selectively execute software instructions. In various embodiments, the processing system 1304 is implemented in various ways. For example, the processing system 1304 can be implemented as one or more physical or logical processing cores. In another example, the processing system 1304 can include one or more separate microprocessors. In yet another example embodiment, the processing system 1304 can include an application-specific integrated circuit (ASIC) that provides specific functionality. In yet another example, the processing system 1304 provides specific functionality by using an ASIC and by executing computer-executable instructions.

The secondary storage device 1306 includes one or more computer storage media. The secondary storage device 1306 stores data and software instructions not directly accessible by the processing system 1304. In other words, the processing system 1304 performs an I/O operation to retrieve data and/or software instructions from the secondary storage device 1306. In various embodiments, the secondary storage device 1306 includes various types of computer storage media. For example, the secondary storage device 1306 can include one or more magnetic disks, magnetic tape drives, optical discs, solid-state memory devices, and/or other types of tangible computer storage media.

The network interface card 1308 enables the computing device 1300 to send data to and receive data from a communication network. In different embodiments, the network interface card 1308 is implemented in different ways. For example, the network interface card 1308 can be implemented as an Ethernet interface, a fiber optic network interface, a wireless network interface (e.g., WiFi, WiMax, Bluetooth, etc.), or another type of network interface.

In optional embodiments where included in the computing device 1300, the video interface 1310 enables the computing device 1300 to output video information to the display unit 1313. The display unit 1313 can be various types of devices for displaying video information, such as an LCD display panel, a plasma screen display panel, a touch-sensitive display panel, an LED or OLED screen, a cathode-ray tube display, or a projector. The video interface 1310 can communicate with the display unit 1313 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1314 enables the computing device 1300 to communicate with external devices. For example, the external component interface 1314 can be a USB interface and/or another type of interface that enables the computing device 1300 to communicate with external devices or peripheral devices integrated within the same housing (e.g., in the case of mobile devices). In various embodiments, the external component interface 1314 enables the computing device 1300 to communicate with various external components, such as external storage devices, input devices, speakers, modems, media player docks, other computing devices, scanners, digital cameras, and fingerprint readers.

The communication medium 1316 facilitates communication among the hardware components of the computing device 1300. The communications medium 1316 facilitates communication among the memory 1302, the processing system 1304, the secondary storage device 1306, the network interface card 1308, the video interface 1310, and the external component interface 1314. The communications medium 1316 can be implemented in various ways. For example, the communication medium 1316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1302 stores various types of data and/or software instructions. The memory 1302 stores a Basic Input/Output System (BIOS) 1318 and an operating system 1320. The BIOS 1318 includes a set of computer-executable instructions that, when executed by the processing system 1304, cause the computing device 1300 to boot up. The operating system 1320 includes a set of computer-executable instructions that, when executed by the processing system 1304, cause the computing device 1300 to provide an operating system that coordinates the activities and sharing of resources of the computing device 1300. Furthermore, the memory 1302 stores application software 1322. The application software 1322 includes computer-executable instructions, that when executed by the processing system 1304, cause the computing device 1300 to provide one or more applications. The memory 1302 also stores program data 1324. The program data 1324 is data used by programs that execute on the computing device 1300.

Although particular features are discussed herein as included within an electronic computing device 1300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include various types of dynamic random access memory (DRAM), solid state memory, read-only memory (ROM), electrically-erasable programmable ROM, magnetic disks (e.g., hard disks, floppy disks, etc.), and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 1300 of FIG. 13, the computer-readable instructions are stored on devices that include non-transitory media. In particular embodiments, the computer-readable instructions are stored on entirely non-transitory media.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of issuing a digital payment card in association with issuance of a physical payment card by a card issuer, the method comprising:

performing a card data preparation process comprising:

in association with issuance of a physical payment card by a card issuer, receiving digital issuance information from the card issuer at a digital card enrollment cloud service, the digital issuance information being based on cardholder data including a cardholder identifier and contact information of a cardholder; and transmitting an enrollment message to the cardholder, the enrollment message being unique to the cardholder and including the cardholder identifier and a selectable notification that, upon selection, causes a mobile application installed at a mobile device of the cardholder to initiate a card digitization process, wherein the enrollment message is transmitted to the cardholder before the cardholder receives the physical payment card; and initiating the card digitization process comprising:

receiving a request from the mobile application to initiate creation of a digital payment card corresponding to the physical payment card at the digital card enrollment cloud service, the request being initiated in response to selection of the selectable notification at the mobile device, wherein the request includes the cardholder identifier;

validating the cardholder identifier received in the request; and in response to validating the cardholder identifier, digitizing the card at the digital card enrollment cloud service.

2. The method of claim 1, wherein the contact information of the cardholder comprises a phone number of the cardholder.

3. The method of claim 1, wherein validating the cardholder identifier received in the request comprises validating the cardholder identifier received in the request against the cardholder identifier received from the card issuer.

4. The method of claim 1, further comprising encrypting and signing the digital issuance information at the digital card enrollment cloud service.

5. The method of claim 1, further comprising receiving the cardholder data at a card issuer.

6. The method of claim 5, further comprising forwarding the cardholder data to a card bureau from the card issuer.

7. The method of claim 6, further comprising receiving the digital issuance information from the card issuer via the card bureau.

8. The method of claim 6, wherein the digital card enrollment cloud service is separate from the card bureau.

9. The method of claim 1, further comprising, at the digital card enrollment cloud service:

splitting the digital issuance information into a first portion and a second portion, the first portion and second portion each obscuring the digital issuance information and being combinable to reconstitute the digital issuance information;

storing the first portion at the digital card enrollment cloud service; and embedding the second portion within the selectable notification that is included in the enrollment message.

10. The method of claim 9, wherein the selectable notification comprises a hyperlink included in at least one of a text message or an email message sent to the cardholder.

11. The method of claim 9, wherein the selectable notification comprises a hyperlink included in a text message sent to the cardholder at a mobile phone number included in the contact information of the cardholder.

12. The method of claim 1, wherein the mobile application is configured for secure communication with the digital card enrollment cloud service.

13. The method of claim 12, wherein the mobile application is provided by the card issuer and incorporates a software development kit enabling secure communication with the digital card enrollment cloud service.

14. The method of claim 12, wherein the mobile application comprises a dedicated mobile application provided independently from the card issuer, and wherein:

the card data preparation process further includes transmitting an enrollment validation message to the cardholder, the enrollment validation message being unique to the cardholder and including a second selectable notification to validate the cardholder during the card digitization process; and the card digitization process further includes receiving a request from the mobile device of the cardholder to validate the cardholder, the request to validate the cardholder being initiated in response to selection of the second selectable notification at the mobile device.

15. The method of claim 1, wherein digitizing the card at the digital card enrollment cloud service does not require prior receipt of the physical payment card by the cardholder.

16. The method of claim 1, wherein digitizing the card at the digital card enrollment cloud service occurs prior to receipt of the physical payment card by the cardholder.

17. A system for issuing a digital payment card in association with issuance of a physical payment card by a card issuer, the system comprising:

a computing device comprising a processor and a memory storing instructions which, when executed, implement a digital card enrollment service configured to perform a card data preparation process and to initiate a card digitization process, wherein the card data preparation process includes:

in association with issuance of a physical payment card by a card issuer, receiving digital issuance information from the card issuer, the digital issuance information being based on cardholder data including a cardholder identifier and contact information of a cardholder; and transmitting an enrollment message to the cardholder, the enrollment message being unique to the cardholder and including the cardholder identifier and a selectable notification that, upon selection, causes a mobile application installed at a mobile device of the cardholder to initiate a card digitization process, wherein the enrollment message is transmitted to the cardholder before the cardholder receives the physical payment card; and wherein the card digitization process comprises:

receiving a request from the mobile application to initiate creation of a digital payment card corresponding to the physical payment card at the digital card enrollment cloud service, the request being initiated in response to selection of the selectable notification at the mobile device, wherein the request includes the cardholder identifier;

validating the cardholder identifier received in the request; and in response to validating the cardholder identifier, digitizing the card at the digital card enrollment cloud service.

18. The system of claim 17, further comprising the mobile device of the cardholder.

* * * * *